UNITED STATES PATENT OFFICE.

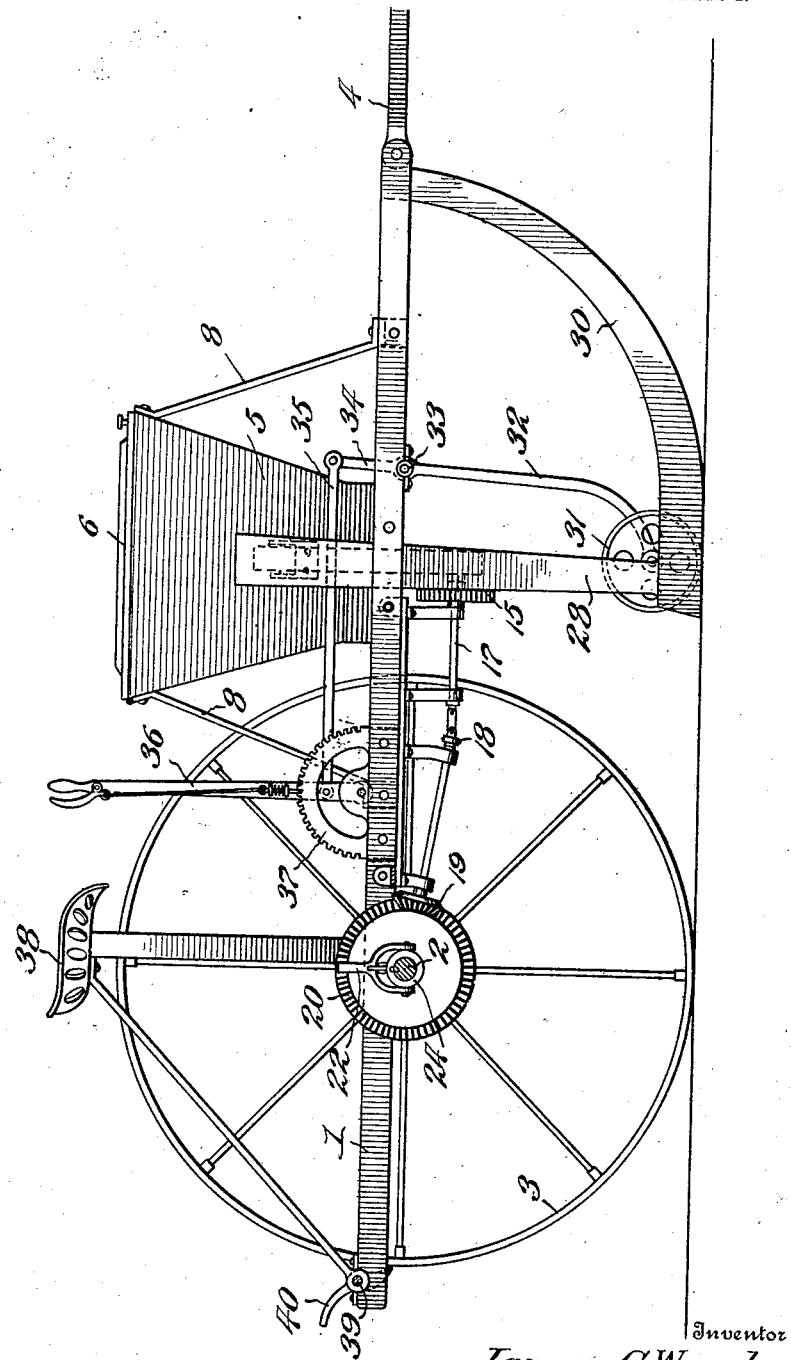

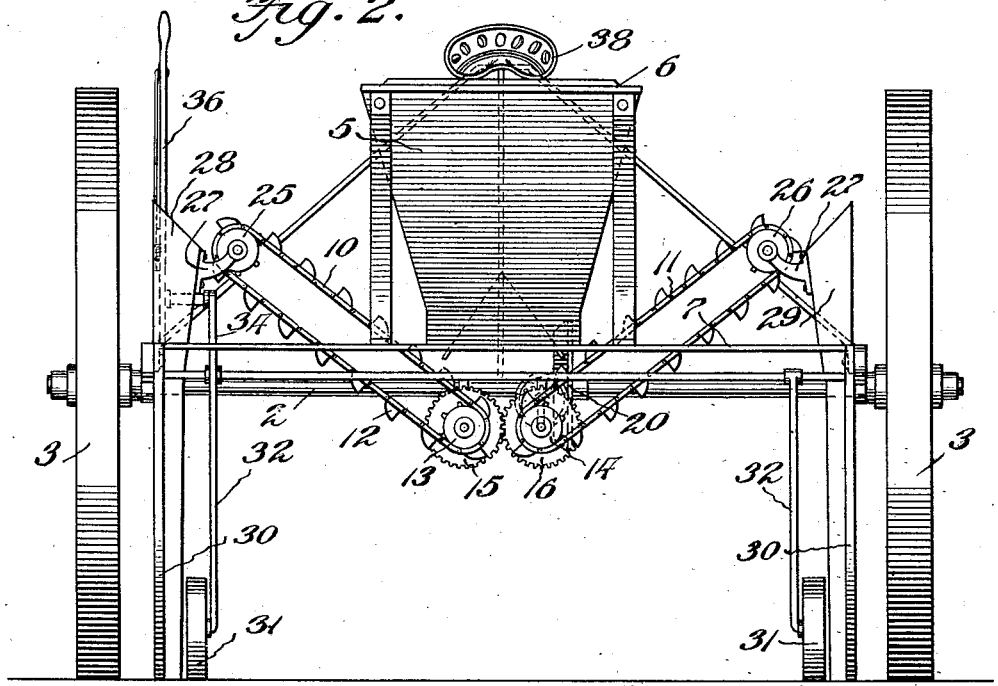
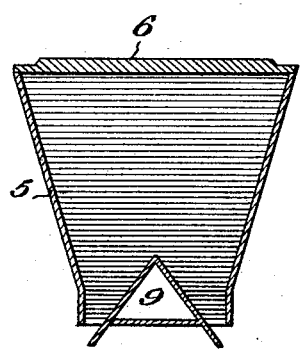
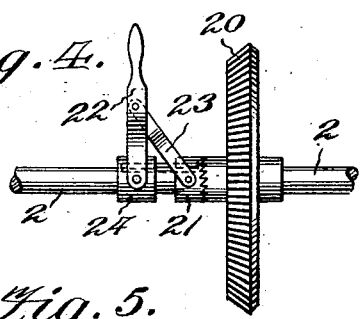
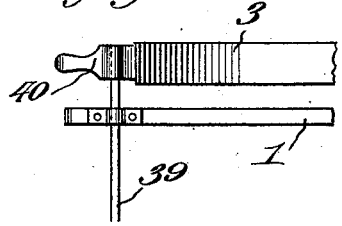

JAMES C. WOOD, OF MARSLAND, NEBRASKA.

POTATO-PLANTER.

No. 915,527.      Specification of Letters Patent.      Patented March 16, 1909.

Application filed April 14, 1908. Serial No. 427,012.

*To all whom it may concern:*

Be it known that I, JAMES C. WOOD, a citizen of the United States, residing at Marsland, in the county of Dawes and State of Nebraska, have invented new and useful Improvements in Potato-Planters, of which the following is a specification.

This invention relates to potato planters and has for its object the production of a simple, reliable and effective double-row potato planter embodying in connection with a centrally arranged hopper, oppositely arranged boots, and positively driven means for carrying or conveying the seed potatoes from the hopper to the boots, the entire planting mechanism being driven by the main rotary axle of the machine. The machine also embodies means for adjusting the discharged ends of the boots or furrow openers up and down to correspond with the depth of the furrows or drills, such adjusting means being under the immediate control of the driver in his seat on the machine.

With the above and other objects in view, the nature of which will more fully appear as the description proceeds, the invention consists in the novel construction, combination and arrangement herein fully described, illustrated and claimed.

In the accompanying drawings:—Figure 1 is a vertical longitudinal section through a potato planter embodying the present invention. Fig. 2 is a front elevation of the same. Fig. 3 is a vertical cross section through the hopper. Fig. 4 is a detail view of the clutch. Fig. 5 is a detail plan view showing one of the scrapers.

Referring to the drawings, 1 designates the main frame of the machine which is provided with suitable bearings in which the main driving axle 2 is journaled, said axle being provided with carrying wheels 3 mounted fast thereon and serving to impart motion to said axle.

4 designates the draft pole or tongue.

Arranged centrally of the machine is a seed potato hopper 5 provided with a cover 6, said hopper being supported on the cross bars 7 of the main frame and held securely in position by braces 8. The hopper gradually contracts toward its lower end where it is provided with an inverted V-shaped deflector 9 which divides the stream of potatoes and deflects the same to opposite sides of the center of the machine so as to be taken up by the oppositely arranged carriers or conveyers 10 and 11. These conveyers, which are best illustrated in Fig. 2, have their inner or lower ends arranged under the hopper and incline in opposite directions upward therefrom as shown, each of said conveyers consisting of an endless chain of buckets or cups 12 each of which is of suitable size to contain one or more seed potatoes. The inner ends of the carriers travel around sprocket wheels 13 and 14, the shafts of which are provided with intermeshing spur gear wheels 15 and 16 whereby the sprocket wheels 13 and 14 are simultaneously driven in opposite directions. One of these sprocket wheels is fast on a tumbling shaft 17 embodying a universal joint said shaft being provided at its rear end with a bevel pinion 19 which meshes with and is driven by a bevel gear wheel 20 on the axle 2 whereby motion is imparted to the tumbling shaft and both of the carriers or conveyers 10 and 11.

The wheel 20 is mounted loose on the axle 2 but is adapted to be thrown into and out of engagement with said axle by means of a sliding clutch 21 having a splined engagement with the axle and movable into and out of engagement of the hub of said wheel as shown in Fig. 4. 22 designates a hand lever connected with the clutch 21 by means of a link 23 and mounted on a sleeve on the axle, whereby the clutch may be thrown. By this means, when the potato planter is not being used as such, the planting mechanism may be thrown out of gear to enable the machine to be driven to and from the place of operation.

At their outer ends the carriers 10 and 11 pass around sprocket wheels 25 and 26 journaled in brackets 27 connected to oppositely arranged boots 28 and 29 which are secured to the side bars of the main frame, the upper ends of said boots being flared and so disposed with relation to the carriers that the potatoes are dumped by the buckets or cups 12 into the upper ends of the boots.

The boots extend down close to the ground so as to discharge the potatoes directly into the furrow and the lower ends of said boots and furrow openers 30 are connected to the forward portion of the machine frame. Just inside of each boot and furrow opener is arranged in close proximity thereto is a gage wheel 31 journaled on the lower end of the lever or pivoted standard 32. These standards are mounted fast on a shaft 33 extending transversely of the machine frame and one of said levers is extended to form an arm 34 which projects above the shaft 33 and is connected by a rod 35 to a thumb latch lever 36 which engages a rack segment 37 on the machine frame. The lever 36 is arranged in convenient relation to the driver's seat 38 so that he may rock said lever and raise and lower the gage wheels 31 thereby correspondingly raising and lowering the boots 28 and 29 and furrow openers 30 to regulate the positions thereof with respect to the depth of the furrows.

39 designates a shaft extending transversely across the rear end of the machine frame, upon which are mounted scrapers 40 adapted to operate in contact with the rims of the carrying wheels 3 to free the same from adhering earth.

The machine hereinabove described, while capable of simultaneously planting two rows, is extremely simple and economical in construction, reliable in operation, and may be operated by anyone without special experience.

Having thus described the invention, what is claimed as new, is:—

1. A double-row potato planter comprising a machine frame, carrying wheels therefor, a centrally arranged hopper, oppositely arranged boots arranged to discharge the potatoes in parallel rows, reversibly inclined and oppositely moving carriers extending from the hopper to the boots and arranged out of contact with the hopper, and a deflector arranged in the hopper and projecting below the bottom thereof for dividing and directing the potatoes from the hopper to the opposite carriers.

2. A double-row potato planter comprising a centrally arranged hopper, a machine frame on which the hopper is supported, carrying wheels for said frame, oppositely arranged boots supported by the frame, oppositely moving carriers which receive the potatoes from the hopper and conduct the same to the boots, gage wheels arranged in close proximity to the discharge ends of the boots, and means for adjusting said gage wheels up and down for regulating the depth of operation of the boot and furrow opener, substantially as and for the purpose described.

In testimony whereof I affix my signature in presence of two witnesses.

JAMES C. WOOD

Witnesses:
  J. H. CLARK,
  C. H. RICHEY.